Nov. 17, 1942.　　　F. B. FREYDL　　　2,302,202
CLOSED CAR VENTILATION
Filed July 25, 1940　　　2 Sheets-Sheet 1

Inventor
Frank Bruno Freydl
By Clarence A. O'Brien
Attorneys

Nov. 17, 1942.　　　F. B. FREYDL　　　2,302,202
CLOSED CAR VENTILATION
Filed July 25, 1940　　　2 Sheets-Sheet 2
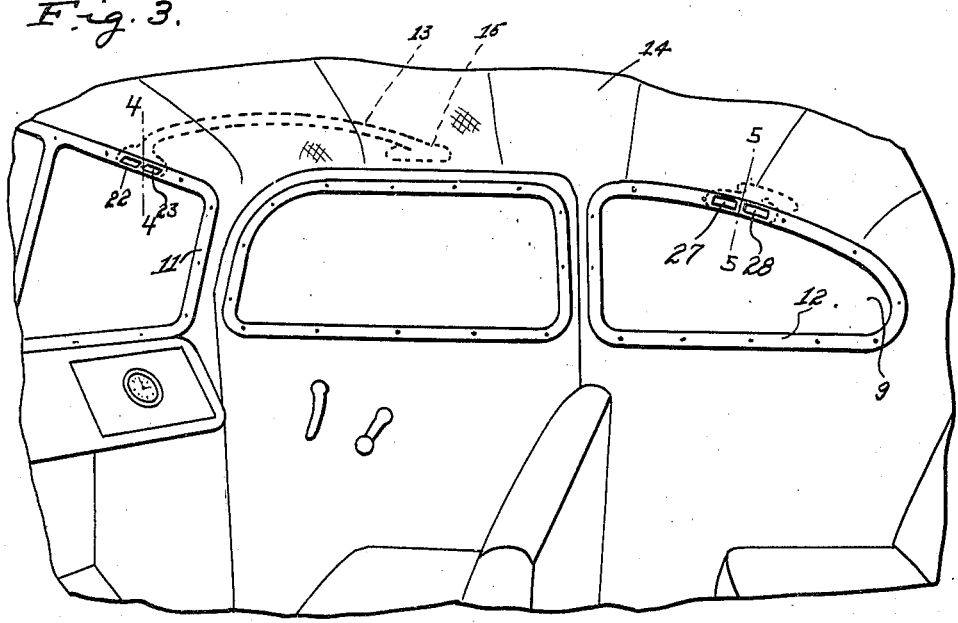
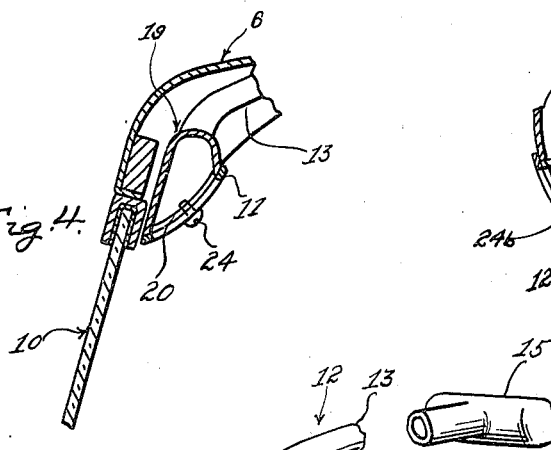
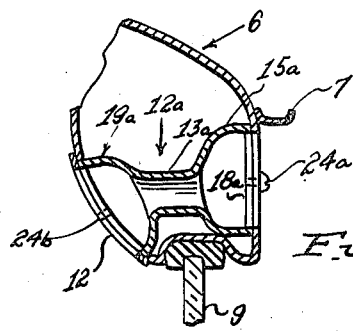
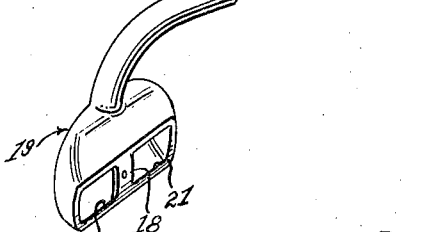
Inventor
Frank Bruno Freydl
By Clarence A. O'Brien
Attorneys Patented Nov. 17, 1942

2,302,202

UNITED STATES PATENT OFFICE 2,302,202

CLOSED CAR VENTILATION

Frank Bruno Freydl, Northville, Mich.

Application July 25, 1940, Serial No. 347,521

1 Claim. (Cl. 98—2)

My invention relates to improvements in ventilation means for closed vehicles, particularly passenger automobiles, and the primary object of my invention is to provide a simple, inexpensive, and automatically operating arrangement of this character.

Other important objects and advantages of my invention will be apparent from a reading of the following description taken in connection with the drawings, wherein for purposes of illustration I have shown a preferred embodiment of my invention.

In the drawings:

Figure 3 is a general fragmentary perspective view of the interior of the automobile.

Figure 4 is a fragmentary enlarged sectional view taken through Figure 3 approximately on the line 4—4.

Figure 5 is an enlarged fragmentary sectional view taken through Figure 3 approximately on the line 5—5, and Figure 6 is a perspective view partly broken away of one of the ventilators for defrosting the windshield.

Figure 1:
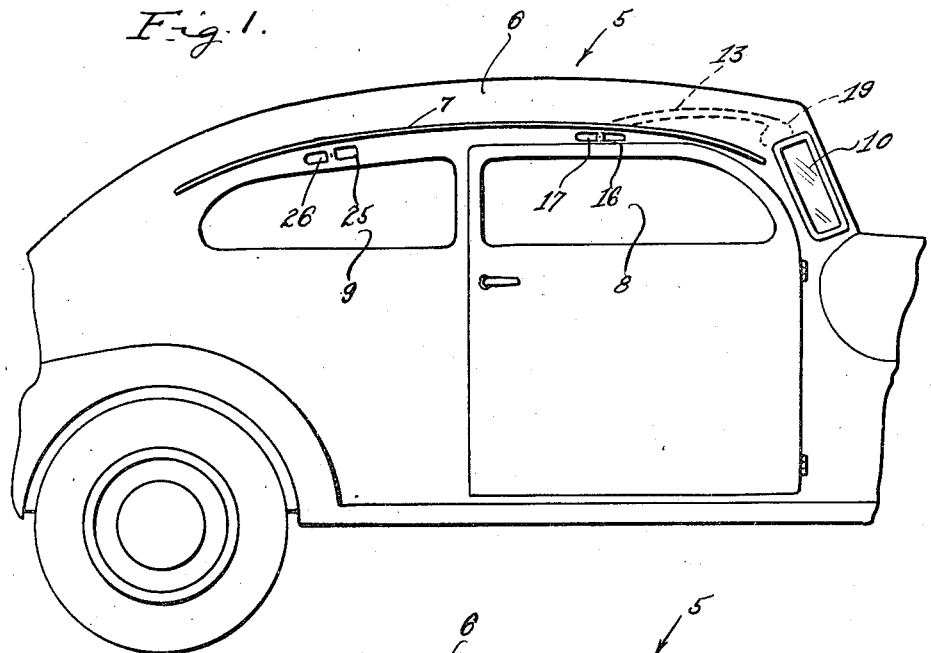
Figure 1 is a fragmentary general right hand side elevational view showing application of the invention to a sedan type of passenger automobile.
Figure 2:
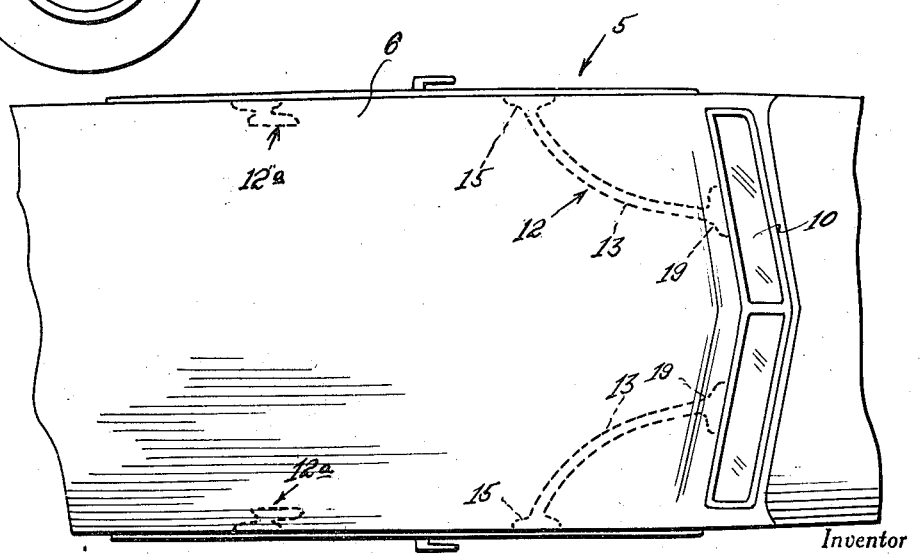
Figure 2 is a fragmentary top plan view of Figure 1 showing in dotted lines the location and arrangement of the various conduits.

Referring in detail to the drawings, the numeral 5 generally designates a sedan type of automobile having the roof 6 along the opposite sides of which are the drains or drip rails 7 above the front side window 8 and the rear side window 9, the body of the automobile having below the front end of the roof the dual windshield 10 having the interior finish moulding or trim 11. The rear side window 9 has the finish trim or moulding 12 like that of the windshield, in accordance with universal present practice.

The present invention contemplates complete equipment of a sedan type of automobile with two front vacuum ventilators and two rear vacuum ventilators, the ventilators having their suction intake orifices opening through the upper parts of the trim or moulding on the windshield and on the rear side window, respectively.

The front ventilators which are similar in arrangement are both designated generally by the numeral 12 and comprise a tube 13 of suitable diameter which is concealed between the metal of the roof 6 and the cloth covering 14, the tube extending from the transversely elongated vacuum head 15 which has longitudinally spaced openings aligned with similar openings 16 and 17 formed in the side of the automobile body. A web 18 between the two openings in the head 15 is used to receive fastening means of a suitable type for securing the head 15 in place. At the opposite end of the tube 13 is the suction head which is generally designated 19 which likewise is horizontally elongated and provided with longitudinally spaced openings 20 and 21 to register with similar openings 22 and 23 formed in the upper horizontal part of the windshield molding 11 as shown in Figure 3. The web 18 between the openings 20 and 21 is used to receive suitable fastening means 24 to secure the suction head 19 to the obverse face of the moulding 11 as shown in Figure 4. The hole-equipped face of the suction head 19 will be contoured to fit the obverse side of the moulding, in a manner generally disclosed in Figure 4 of the drawings.

The ventilators for the rear side windows are generally designated by the numeral 12a, each comprising a relatively short conduit 13a and on one end of which is the horizontally elongated vacuum head 15a having longitudinally spaced openings to fit the longitudinally spaced openings 27 and 28 in the upper part of the rear side window trim moulding 12 as indicated in Figure 3, a web 18a receiving fastening means 24a traversing the side of the car body between the openings 25 and 26 to fashion the vacuum head in place. On the opposite end of the short conduit 13a in the induction head 19a which has longitudinally spaced openings similar to those in the head 19 and registered with openings 27 and 28 in the upper part of the rear side window moulding 12, the hole equipped face of the induction head 19a being contoured to fit the moulding as indicated in Figure 5. Fastening means 24b is used as already described to assemble the face of the suction head 19 to the window moulding 12.

It is believed obvious that with the arrangements set forth, the forward motion of the automobile will create a vacuum at the vacuum heads of the front and rear ventilators, so that a suction through the conduits 13 and 13a is created which exerts a suction through the suction heads 19 and 19a, which withdraws air and vapors from the regions of the windshield and the rear side window, respectively. This withdrawal not only effects removal of contaminated air from the interior of the automobile, but also removes vapors which would otherwise frost or steam the windows and windshield.

Although I have shown and described herein preferred embodiments of my invention, it is to be definitely understood that I do not desire to limit the application to the precise structure and arrangement of parts shown and described, except as may be required by the scope of the subjoined claim.

Having described the invention, what is claimed as new is:

The combination with a closed automobile body having a hollow top structure and trim moulding extending around the windshield with a pair of side-by-side through openings therein communicating with the interior of said body, of suction means to displace air from the interior of the body under travel of the automobile comprising an elongated vacuum head within said top communicating with the outside atmosphere through the side edge of the top structure, a similar elongated suction head within said top having a pair of side-by-side openings therein registering with the pair of openings first mentioned to draw air out of the interior of the body, and a relatively smaller tubular conduit within said top establishing communication between said heads.

FRANK BRUNO FREYDL.